(12) United States Patent
Kim et al.

(10) Patent No.: US 12,567,413 B2
(45) Date of Patent: Mar. 3, 2026

(54) ELECTRONIC APPARATUS FOR PERFORMING AN OPERATION CORRESPONDING TO A USER'S VOICE AND CONTROL METHOD THEREOF

(71) Applicant: Samsung Electronics Co., Ltd., Suwon-si (KR)

(72) Inventors: Jeongseop Kim, Suwon-si (KR); Dongjae Lim, Suwon-si (KR); Minsung Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 18/346,537

(22) Filed: Jul. 3, 2023

(65) Prior Publication Data

US 2024/0119931 A1      Apr. 11, 2024

Related U.S. Application Data

(63) Continuation of application No. PCT/KR2023/008453, filed on Jun. 19, 2023.

(30) Foreign Application Priority Data

Oct. 11, 2022     (KR) ........................ 10-2022-0129887

(51) Int. Cl.
　　*G10L 15/22* 　　　(2006.01)
　　*G10L 15/18* 　　　(2013.01)
(52) U.S. Cl.
　　CPC .............. *G10L 15/22* (2013.01); *G10L 15/18* (2013.01); *G10L 2015/223* (2013.01)
(58) Field of Classification Search
　　USPC ........................ 704/246, 247, 251, 252, 275
　　See application file for complete search history.

(56) References Cited

U.S. PATENT DOCUMENTS 7,817,784 B2 * 10/2010 Wang .................... H04M 3/493
　　　　　　　　　　　　　　　　　　　　　　　379/88.22
10,818,289 B2　 10/2020 Jaygarl et al.
(Continued)

FOREIGN PATENT DOCUMENTS

CN　　　　11166782 A　　　9/2020
EP　　　2 980 694 A2　　2/2016
(Continued)

OTHER PUBLICATIONS

International Search Report and Written Opinion dated Oct. 12, 2023, issued in International Patent Application No. CT/KR2023/008453.

(Continued)

*Primary Examiner* — Leonard Saint-Cyr
(74) *Attorney, Agent, or Firm* — Jefferson IP Law, LLP

(57) ABSTRACT

An electronic apparatus is provided. The electronic apparatus includes a memory configured to store a plurality of nodes corresponding to a plurality of user interface (UI) types, for each application, a display, and a processor connected with the memory and the display and controls the electronic apparatus, wherein the processor is configured to identify a first UI graph corresponding to the target application, acquire information on a target node that will perform the user command among a plurality of first nodes included in the first UI graph based on the user command and the at least one parameter, identify the current node corresponding to a UI displayed through the display, identify an action sequence from the current node to the target node based on the information on the current node and the target node, and perform an action corresponding to the user voice based on the action sequence.

17 Claims, 14 Drawing Sheets

(56) References Cited

U.S. PATENT DOCUMENTS

| | | | |
|---|---|---|---|
| 11,360,791 | B2 | 6/2022 | Kim et al. |
| 2011/0178804 | A1 | 7/2011 | Inoue et al. |
| 2014/0351717 | A1 | 11/2014 | Pryor et al. |
| 2017/0060545 | A1 | 3/2017 | Allen et al. |
| 2017/0084273 | A1 | 3/2017 | Zohar et al. |
| 2017/0255445 | A1 | 9/2017 | Seolas et al. |
| 2018/0150280 | A1* | 5/2018 | Rhee ...................... G06F 9/451 |
| 2018/0341466 | A1 | 11/2018 | Upadhyay et al. |
| 2019/0066674 | A1 | 2/2019 | Jaygarl et al. |
| 2020/0020334 | A1 | 1/2020 | Kang et al. |
| 2020/0380985 | A1* | 12/2020 | Gada ...................... G06F 3/167 |
| 2021/0109703 | A1 | 4/2021 | Kim et al. |
| 2021/0118442 | A1* | 4/2021 | Poddar ................... G06N 3/082 |
| 2021/0407507 | A1 | 12/2021 | Zhou et al. |
| 2022/0036001 | A1 | 2/2022 | Taylor |
| 2022/0093098 | A1 | 3/2022 | Samal et al. |
| 2022/0129556 | A1* | 4/2022 | Chen ...................... G06F 21/74 |
| 2022/0188523 | A1* | 6/2022 | Koneru ................. G06F 40/279 |
| 2022/0284362 | A1* | 9/2022 | Bellinger ............. G06Q 10/063 |
| 2022/0404956 | A1 | 12/2022 | Choi et al. |

FOREIGN PATENT DOCUMENTS

| | | |
|---|---|---|
| KR | 10-2016-0014670 A | 2/2016 |
| KR | 10-2019-0023341 A | 3/2019 |
| KR | 10-2367132 B1 | 2/2022 |
| KR | 10-2022-0040997 A | 3/2022 |
| KR | 10-2389996 B1 | 4/2022 |
| KR | 10-2022-0168972 A | 12/2022 |

OTHER PUBLICATIONS

Extended European Search Report dated Jun. 3, 2025, issued in European Application No. 23877416.0-1218.
European Communication pursuant to Article 94(3) EPC dated Nov. 20, 2025, issued in European Application No. 23 877 416.0-1218.

* cited by examiner

Screenshots/0.jpeg                Screens/0.json                uiElements[3]

FIG. 5

```
⊟ []JSON
  ⊟ {}0
    ⊟ []edges
      ⊟ {}0
        ⊟ {}action
          ├─ □ actionType:"ACTION_CLICK"
          ├─ □ destScreenIndex:1
          ⊞ {}eventUiElement
          ├─ □ sourceScreenIndex:0
          └─ □ text:
        └─ □ destNodeIndex:1
    ⊟ []screens
      └─ □ 0:0
  ⊞ {}1
``` graph.json

FIG. 11

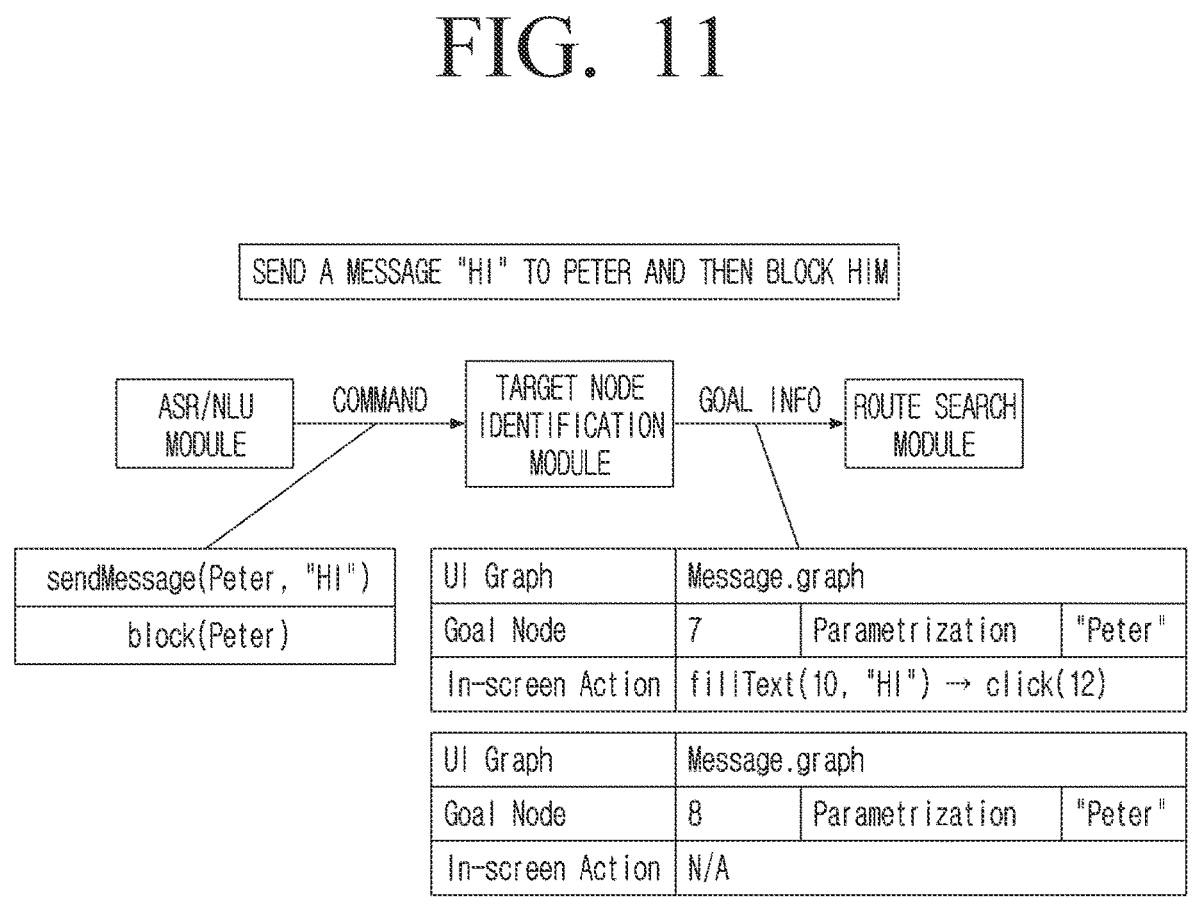

| SEND A MESSAGE "HI" TO PETER AND THEN BLOCK HIM |
|---|

```
┌──────────┐  COMMAND  ┌──────────────┐  GOAL INFO  ┌──────────────┐
│ ASR/NLU  │ ────────> │ TARGET NODE  │ ──────────> │ ROUTE SEARCH │
│ MODULE   │           │IDENTIFICATION│             │   MODULE     │
└──────────┘           │   MODULE     │             └──────────────┘
                       └──────────────┘
```

| sendMessage(Peter, "HI") |
|---|
| block(Peter) |

| UI Graph | Message.graph | | |
|---|---|---|---|
| Goal Node | 7 | Parametrization | "Peter" |
| In-screen Action | fillText(10, "HI") → click(12) | | |

| UI Graph | Message.graph | | |
|---|---|---|---|
| Goal Node | 8 | Parametrization | "Peter" |
| In-screen Action | N/A | | |

FIG. 12

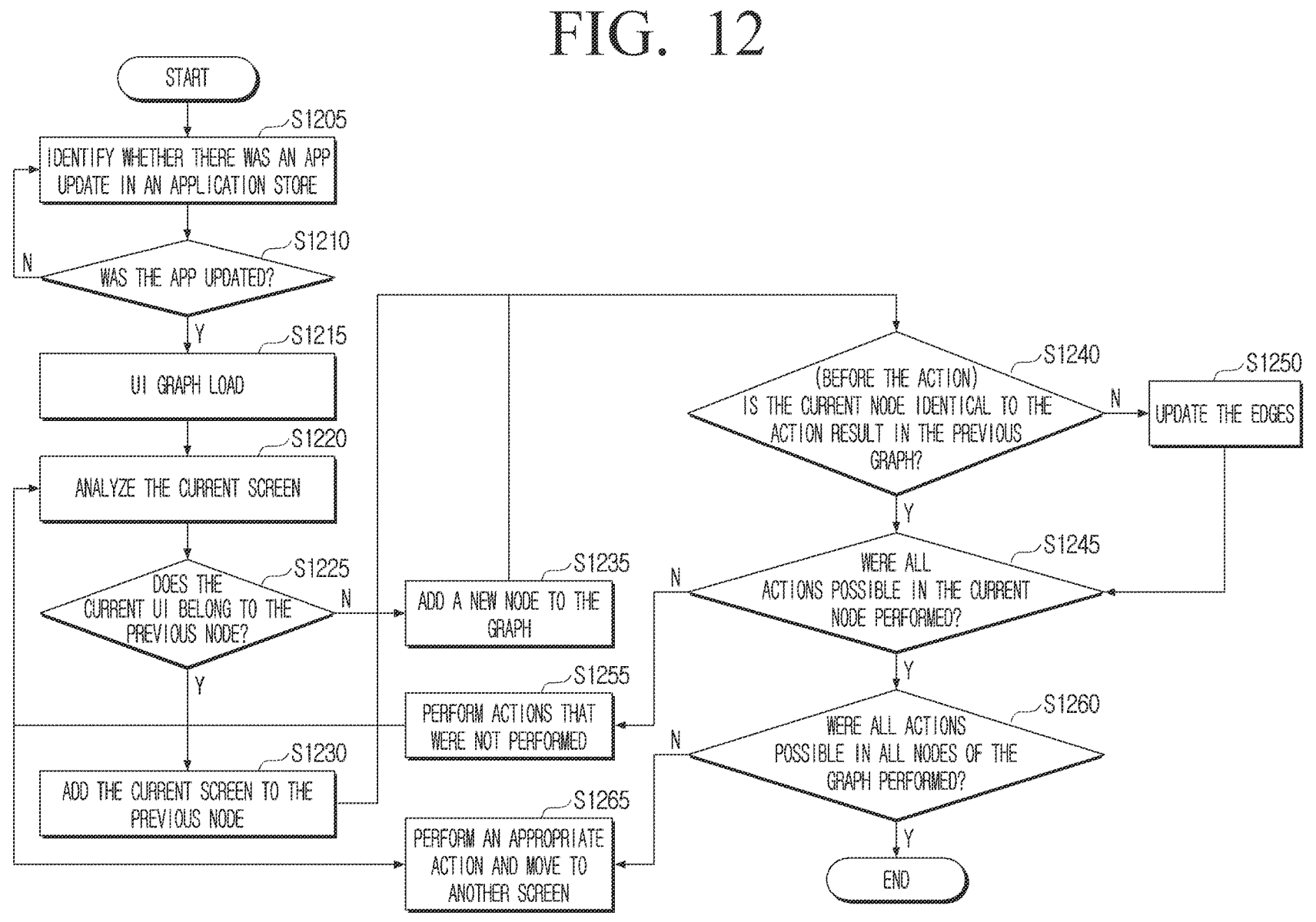

START

S1205 — IDENTIFY WHETHER THERE WAS AN APP UPDATE IN AN APPLICATION STORE

S1210 — WAS THE APP UPDATED?

N → (back to S1205)

Y

S1215 — UI GRAPH LOAD

S1220 — ANALYZE THE CURRENT SCREEN

S1225 — DOES THE CURRENT UI BELONG TO THE PREVIOUS NODE?

N → S1235 — ADD A NEW NODE TO THE GRAPH

Y

S1230 — ADD THE CURRENT SCREEN TO THE PREVIOUS NODE

S1240 — (BEFORE THE ACTION) IS THE CURRENT NODE IDENTICAL TO THE ACTION RESULT IN THE PREVIOUS GRAPH?

N → S1250 — UPDATE THE EDGES

Y

S1245 — WERE ALL ACTIONS POSSIBLE IN THE CURRENT NODE PERFORMED?

N → S1255 — PERFORM ACTIONS THAT WERE NOT PERFORMED

Y

S1260 — WERE ALL ACTIONS POSSIBLE IN ALL NODES OF THE GRAPH PERFORMED?

N → S1265 — PERFORM AN APPROPRIATE ACTION AND MOVE TO ANOTHER SCREEN

Y

END

1310

1320

ELECTRONIC APPARATUS FOR PERFORMING AN OPERATION CORRESPONDING TO A USER'S VOICE AND CONTROL METHOD THEREOF

CROSS-REFERENCE TO RELATED APPLICATION(S)

This application is a continuation application, claiming priority under § 365(c), of an International application No. PCT/KR2023/008453, filed on Jun. 19, 2023, which is based on and claims the benefit of a Korean patent application number 10-2022-0129887, filed on Oct. 11, 2022, in the Korean Intellectual Property Office, the disclosure of which is incorporated by reference herein in its entirety.

BACKGROUND OF THE INVENTION

1. Field of the Invention

The disclosure relates to an electronic apparatus and a control method thereof. More particularly, the disclosure relates to an electronic apparatus performing an operation corresponding to a user voice, and a control method thereof.

2. Description of the Prior Art

With the development of electronic technologies, electronic apparatuses in various types are being developed. More particularly, recently, diversity of applications are being secured as manufacturers of applications and manufacturers of apparatuses wherein applications are driven are different.

More particularly, it is possible to control an application with a user voice, but in this case, an open application programming interface (API) may be provided from the manufacturer of the application, or the use range may be restricted to an application provided by the manufacturer of the apparatus.

In the case of controlling an application to which an API is not provided, as it is designated that a user interface (UI) manipulation according to a command performs a fixed operation, when a UI update occurs, a manual operation is necessary for providing this, and thus a gap may be generated in providing a function.

The above information is presented as background information only to assist with an understanding of the disclosure. No determination has been made, and no assertion is made, as to whether any of the above might be applicable as prior art with regard to the disclosure.

SUMMARY OF THE INVENTION

Aspects of the disclosure are to address at least the above-mentioned problems and/or disadvantages and to provide at least the advantages described below. Accordingly, an aspect of the disclosure is to provide an electronic apparatus performing an operation corresponding to a user voice, and a method of controlling thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a memory configured to store a plurality of nodes corresponding to a plurality of UI types provided by an application and a UI graph, for each application, including a plurality of edges indicating the connective relation among the nodes based on actions that can be performed in the plurality of nodes, a display, and a processor connected with the memory and the display and controls the electronic apparatus, wherein the processor is configured to, based on receiving a user voice, perform natural language understanding (NLU) for the user voice and identify a user command included in the user voice, at least one parameter, and a target application, identify a first UI graph corresponding to the target application, acquire information on a target node that will perform the user command among a plurality of first nodes included in the first UI graph based on the user command and the at least one parameter, wherein the information on the target node includes identification information for the target node that will perform the user command, action information corresponding to the user command to be performed in the target node, and information on the at least one parameter, identify the current node corresponding to a UI displayed through the display, identify an action sequence from the current node to the target node based on the information on the current node and the target node, and perform an action corresponding to the user voice based on the action sequence.

Also, the processor performs the action corresponding to the user voice in the target node based on the at least one parameter.

In addition, the processor performs the action corresponding to the user voice by sequentially performing actions in a plurality of second nodes included in the action sequence.

Further, the processor, based on it being impossible to perform an action in one node among the plurality of second nodes, identifies a new action sequence from the node wherein it is impossible to perform an action to the target node based on the information on the node wherein it is impossible to perform an action and the target node, and perform the action corresponding to the user voice based on the new action sequence.

Also, the processor identifies the shortest route from the current node to the target node based on the plurality of first nodes and a plurality of first edges corresponding to the plurality of first nodes, and identify the action sequence based on the shortest route.

In addition, the processor, based on the target application having been executed, identifies the current node based on the UI of the target application displayed through the display, and based on the target application not having been executed, execute the target application, and identify the current node based on the UI of the target application displayed through the display.

Further, the processor identifies at least one application that can process the user command among a plurality of applications, and identify the target application among the at least one application based on the use frequency of the at least one application.

Also, the processor, based on identifying an update of the target application, updates the first UI graph by identifying a new UI among a plurality of UIs provided by the target application as one of the plurality of first nodes or adding the UI as a new node based on the metadata of each of the plurality of UIs provided by the target application, and identifying a new connective relation among the nodes based on actions that can be performed in each of the plurality of UIs provided by the target application.

In addition, the processor, based on the metadata of each of a plurality of UIs provided by each of a plurality of applications, identifies each of the plurality of UIs as one of the plurality of nodes, and identify the plurality of edges indicating the connective relation among the nodes based on actions that can be performed in each of the plurality of UIs to acquire a UI graph of each of the plurality of applications.

Further, the processor identifies the plurality of edges indicating the connective relation among the nodes by executing a plurality of UI elements included in each of the plurality of UIs, and convert a predetermined UI element among the plurality of UI elements into a parameter to acquire the UI graph of each of the plurality of applications.

Also, the processor acquires the metadata of each of the plurality of UIs from an operating system installed in the electronic apparatus.

In accordance with another aspect of the disclosure, a method of controlling an electronic apparatus wherein a plurality of nodes corresponding to a plurality of UI types provided by an application and a UI graph, for each application, including a plurality of edges indicating the connective relation among the nodes based on actions that can be performed in the plurality of nodes are stored is provided. The method includes the steps of, based on receiving a user voice, performing natural language understanding for the user voice and identifying a user command included in the user voice, at least one parameter, and a target application, identifying a first UI graph corresponding to the target application, acquiring information on a target node that will perform the user command among a plurality of first nodes included in the first UI graph based on the user command and the at least one parameter, identifying the current node corresponding to a UI displayed through a display of the electronic apparatus, identifying an action sequence from the current node to the target node based on the information on the current node and the target node, and performing an action corresponding to the user voice based on the action sequence, wherein the information on the target node includes identification information for the target node that will perform the user command, action information corresponding to the user command to be performed in the target node, and information on the at least one parameter.

Also, in the performing step, the action corresponding to the user voice is performed in the target node based on the at least one parameter.

In addition, in the performing step, the action corresponding to the user voice is performed by sequentially performing actions in a plurality of second nodes included in the action sequence.

Further, in the performing step, based on it being impossible to perform an action in one node among the plurality of second nodes, a new action sequence from the node wherein it is impossible to perform an action to the target node is identified based on the information on the node wherein it is impossible to perform an action and the target node, and the action corresponding to the user voice is performed based on the new action sequence.

Also, in the performing step, the shortest route from the current node to the target node is identified based on the plurality of first nodes and a plurality of first edges corresponding to the plurality of first nodes, and the action sequence is identified based on the shortest route.

In addition, in the step of identifying the current node, based on the target application having been executed, the current node is identified based on the UI of the target application displayed through the display, and based on the target application not having been executed, the target application is executed, and the current node is identified based on the UI of the target application displayed through the display.

Further, in the step of identifying the target application, at least one application that can process the user command is identified among a plurality of applications, and the target application is identified among the at least one application based on the use frequency of the at least one application.

Also, the method further includes the step of, based on identifying an update of the target application, updating the first UI graph by identifying a new UI among a plurality of UIs provided by the target application as one of the plurality of first nodes or adding the UI as a new node based on the metadata of each of the plurality of UIs provided by the target application, and identifying a new connective relation among the nodes based on actions that can be performed in each of the plurality of UIs provided by the target application.

In addition, the method further includes the step of, based on the metadata of each of a plurality of UIs provided by each of a plurality of applications, identifying each of the plurality of UIs as one of the plurality of nodes, and identifying the plurality of edges indicating the connective relation among the nodes based on actions that can be performed in each of the plurality of UIs to acquire a UI graph of each of the plurality of applications.

Further, in the step of acquiring the UI graph, the plurality of edges indicating the connective relation among the nodes is identified by executing a plurality of UI elements included in each of the plurality of UIs, and a predetermined UI element among the plurality of UI elements is converted into a parameter to acquire the UI graph of each of the plurality of applications.

Also, in the step of acquiring the UI graph, the metadata of each of the plurality of UIs is acquired from an operating system installed in the electronic apparatus.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiment of the disclosure will be more apparent from the following description taken in conjunction with the accompanying drawings, in which:

FIG. 3 is a block diagram illustrating a configuration of an electronic apparatus according to an embodiment of the disclosure;

FIG. 5 is a diagram for illustrating edges indicating a connective relation among nodes according to an embodiment of the disclosure;

FIGS. 10 and 11 are diagrams for illustrating an action according to a user voice according to various embodiments of the disclosure;

FIGS. 12 and 13 are diagrams for illustrating an updating operation of a UI graph according to various embodiments of the disclosure.

Throughout the drawings, it should be noted that like reference numbers are used to depict the same or similar elements, features, and structures.

DESCRIPTION OF THE PREFERRED EMBODIMENT

Figure 1:
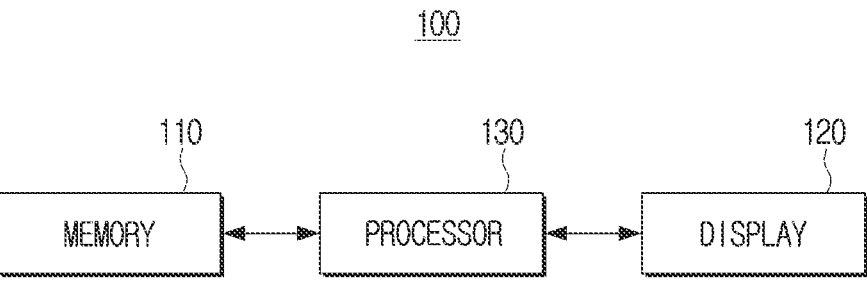
FIG. 1 is a block diagram for illustrating a hardware configuration of an electronic apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The purpose of the disclosure is in providing an electronic apparatus that acquires a UI graph, performs an action corresponding to a user voice based on the UI graph, and updates the UI graph, and a control method thereof.

Hereinafter, the disclosure will be described with reference to the accompanying drawings.

As terms used in the embodiments of the disclosure, general terms that are currently used widely were selected as far as possible, based on the functions described in the disclosure. However, the terms may vary depending on the intention of those skilled in the art who work in the pertinent field, previous court decisions, or emergence of new technologies, or the like. In addition, in particular cases, there may be terms that were designated by the applicant on his own, and in such cases, the meaning of the terms will be described in the relevant descriptions in the disclosure. Accordingly, the terms used in the disclosure should be defined based on the meaning of the terms and the overall content of the disclosure, but not just based on the names of the terms.

Also, in this specification, expressions, such as "have," "may have," "include," and "may include" denote the existence of such characteristics (e.g.: elements, such as numbers, functions, operations, and components), and do not exclude the existence of additional characteristics.

In addition, the expression "at least one of A and/or B" should be interpreted to mean any one of "A" or "B" or "A and B."

Further, the expressions "first," "second," and the like used in this specification may describe various elements regardless of any order and/or degree of importance. Also, such expressions are used only to distinguish one element from another element, and are not intended to limit the elements.

Further, in the disclosure, terms, such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Also, in this specification, the term "user" may refer to a person who uses an electronic apparatus or an apparatus using an electronic apparatus (e.g.: an artificial intelligence electronic apparatus).

Hereinafter, various embodiments of the disclosure will be described with reference to the accompanying drawings.

FIG. 1 is a block diagram for illustrating a hardware configuration of an electronic apparatus according to an embodiment of the disclosure.

Referring to FIG. 1, an electronic apparatus 100 may be an apparatus that performs an action according to a user voice. For example, the electronic apparatus 100 may be an apparatus that includes a display, such as a television (TV), a desktop personal computer (PC), a laptop PC, a video wall, a large format display (LFD), digital signage, a digital information display (DID), a projector display, a smartphone, a tablet PC, or the like, and displays a screen provided by an application, and performs an action of the application according to a user voice. Alternatively, the electronic apparatus 100 may be an apparatus that transmits a screen provided by an application to an apparatus including a display, such as a set-top box (STB), and performs an action of the application according to a user voice. However, the disclosure is not limited thereto, and the electronic apparatus 100 can be any apparatus that can perform an action according to a user voice.

Referring to FIG. 1, the electronic apparatus 100 includes a memory 110, a display 120, and a processor 130. However, the disclosure is not limited thereto, and the electronic apparatus 100 may be implemented in a form wherein some components are excluded.

The memory 110 may refer to hardware that stores information, such as data, or the like, in an electric or a magnetic form so that the processor 130, or the like, can access the information. For this, the memory 110 may be implemented as at least one hardware among a non-volatile memory, a volatile memory, a flash memory, a hard disc drive (HDD) or a solid state drive (SSD), a random access memory (RAM), a random nonvolatile memory (ROM), or the like.

In the memory 110, at least one instruction necessary for the operations of the electronic apparatus 100 or the processor 130 may be stored. Here, an instruction is a code unit instructing the operation of the electronic apparatus 100 or the processor 130, and it may have been drafted in a machine language which is a language that can be understood by a computer. Alternatively, in the memory 110, a plurality of instructions that perform specific tasks of the electronic apparatus 100 or the processor 130 may be stored as an instruction set.

In the memory 110, data which is information in bit or byte units that can indicate characters, numbers, images, or the like, may be stored. For example, in the memory 110, a UI graph may be stored for each application.

The memory 110 may be accessed by the processor 130, and reading/recording/correction/deletion/update, or the like, for an instruction, an instruction set, or data may be performed by the processor 130.

The display 120 is a component that displays an image, and it may be implemented as displays in various forms, such as a liquid crystal display (LCD), an organic light emitting diodes (OLED) display, a plasma display panel (PDP), or the like. Inside the display 120, a driving circuit that may be implemented in forms, such as an a-si thin film transistor (TFT), a low temperature poly silicon (LTPS) TFT, an organic TFT (OTFT), or the like, and a backlight unit, or the like, may also be included together. Meanwhile, the display 120 may be implemented as a touch screen combined with a touch sensor, a flexible display, a third-dimensional (3D) display, or the like.

The processor 130 controls the overall operations of the electronic apparatus 100. Specifically, the processor 130 may be connected with each component of the electronic apparatus 100, and control the overall operations of the electronic apparatus 100. For example, the processor 130 may be connected with components, such as the memory 110, the display 120, or the like, and control the operations of the electronic apparatus 100.

The processor 130 may include one or more of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The processor 130 may control one or a random combination of the other components of the electronic apparatus 100, and perform an operation related to communication or data processing. Also, the processor 130 may execute one or more programs or instructions stored in the memory 110. For example, the processor 130 may perform the method according to one or more embodiments of the disclosure by executing at least one instruction stored in the memory 110.

In case the method according to one or more embodiments of the disclosure includes a plurality of actions, the plurality of actions may be performed by one processor, or performed by a plurality of processors. For example, when a first action, a second action, and a third action are performed by the method according to one or more embodiments, all of the first action, the second action, and the third action may be performed by a first processor, or the first action and the second action may be performed by the first processor (e.g., a generic-purpose processor), and the third action may be performed by a second processor (e.g., an artificial intelligence-dedicated processor).

The processor 130 may be implemented as a single core processor including one core, or it may be implemented as one or more multicore processors including a plurality of cores (e.g., multicores of the same kind or multicores of different kinds). In case the processor 130 is implemented as a multicore processor, each of the plurality of cores included in the multicore processor may include an internal memory of the processor, such as a cache memory, an on-chip memory, or the like, and a common cache shared by the plurality of cores may be included in the multicore processor. Also, each of the plurality of cores (or some of the plurality of cores) included in the multicore processor may independently read a program instruction for implementing the method according to one or more embodiments of the disclosure and perform the instruction, or the plurality of entire cores (or some of the cores) may be linked with one another, and read a program instruction for implementing the method according to one or more embodiments of the disclosure and perform the instruction.

In case the method according to one or more embodiments of the disclosure includes a plurality of actions, the plurality of actions may be performed by one core among the plurality of cores included in the multicore processor, or performed by the plurality of cores. For example, when the first action, the second action, and the third action are performed by the method according to one or more embodiments, all of the first action, the second action, and the third action may be performed by a first core included in the multicore processor, or the first action and the second action may be performed by the first core included in the multicore processor, and the third action may be performed by a second core included in the multicore processor.

In the embodiments of the disclosure, the processor 130 may mean a system on chip (SoC) wherein at least one processor and other electronic components are integrated, a single core processor, a multicore processor, or cores included in a single core processor or a multicore processor. Here, the cores may be implemented as a CPU, a GPU, an APU, a MIC, a DSP, an NPU, a hardware accelerator, or a machine learning accelerator, or the like, but the embodiments of the disclosure are not limited thereto. However, operations of the electronic apparatus 100 will be explained with the expression 'the processor 130' below, for the convenience of explanation.

When a user voice is received, the processor 130 may perform natural language understanding for the user voice and identify a user command included in the user voice, at least one parameter, and a target application, identify a first UI graph corresponding to the target application, acquire information on a target node that will perform the user command among a plurality of first nodes included in the first UI graph based on the user command and the at least one parameter, wherein the information on the target node includes identification information for the target node that will perform the user command, action information corresponding to the user command to be performed in the target node, and information on the at least one parameter, identify the current node corresponding to a UI displayed through the display 120, identify an action sequence from the current node to the target node based on the information on the current node and the target node, and perform an action corresponding to the user voice based on the action sequence.

Such operations of the processor 130 will be described through the various kinds of modules in FIG. 2.

Figure 2:
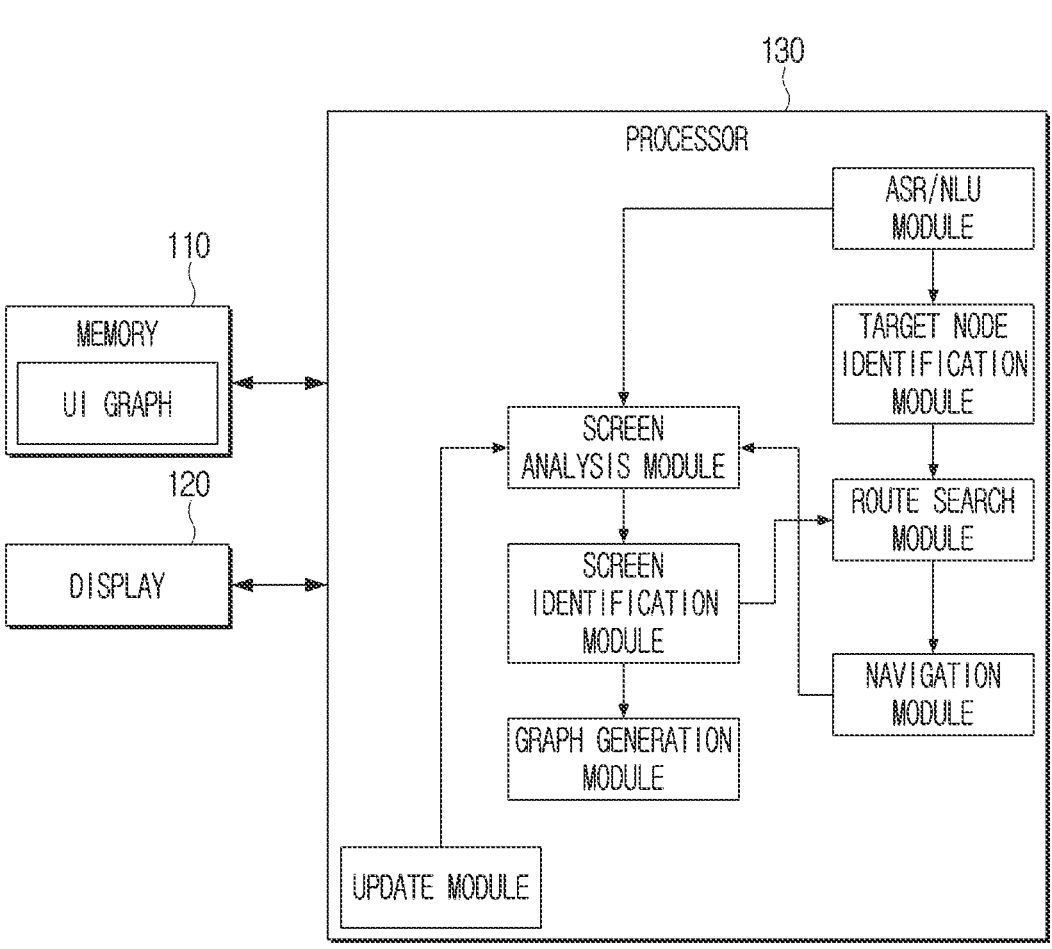
FIG. 2 is a block diagram for illustrating a software configuration of an electronic apparatus according to an embodiment of the disclosure.

FIG. 2 is a block diagram for illustrating a software configuration of an electronic apparatus according to an embodiment of the disclosure.

Referring to FIG. 2, the reason that a plurality of modules are located inside the processor 130 is for indicating a state wherein the plurality of modules are loaded (or executed) by the processor 130 and are operated in the processor 130, and the plurality of modules may have been stored in the memory 110 in advance.

Referring to FIG. 2, in the memory 110, a UI graph may be stored for each application. Here, a UI graph may include a plurality of nodes corresponding to a plurality of UI types provided by an application and a plurality of edges indicating the connective relation among the nodes based on actions that can be performed in the plurality of nodes.

The processor 130 may control the overall operations of the electronic apparatus 100 by executing the modules or instructions stored in the memory 110. Specifically, the processor 130 may determine a sequence which reads and interprets modules or instructions and which is for data processing, and may control the operations of the other components by transmitting control signals controlling the operations of the other components, such as the memory 110, or the like.

When a user voice is received, the processor 130 may perform natural language understanding for the user voice by executing an automatic speech recognition (ASR)/NLU module, and identify a user command included in the user voice, at least one parameter, and a target application. For example, if a user voice which is "Send a message hi to Peter" is received, the processor 130 may perform natural language understanding for the user voice by executing the ASR/NLU module, and identify a user command which is sendMessage from the user voice, identify at least one parameter which is Peter, and identify a message application as the target application.

The processor 130 may identify the first UI graph corresponding to the target application by executing a target node identification module, and acquire information on a target node that will perform the user command among the plurality of first nodes included in the first UI graph based on the user command and the at least one parameter. Here, the information on the target node may include identification information for the target node that will perform the user command, action information corresponding to the user command to be performed in the target node, and information on the at least one parameter.

For example, the processor 130 may identify the first UI graph corresponding to the message application by executing the target node identification module, and acquire a goal node 7 corresponding to the message window as the identification information on the target node based on sendMessage and Peter, acquire filltext(Hi)→click as the action information corresponding to the user command to be performed in the target node, and acquire Peter as the information on the at least one parameter.

The processor 130 may identify the current node corresponding to a UI displayed through the display 120 by executing a screen analysis module and a screen identification module. For example, the processor 130 may acquire UI elements included in the UI displayed through the display 120 by executing the screen analysis module, and identify the attribute of each element. Also, the processor 130 may identify a node corresponding to the analysis result of the UI displayed through the display 120 as the current node by executing the screen identification module.

The processor 130 may identify an action sequence from the current node to the target node based on the information on the current node and the target node by executing a route search module, and perform an action corresponding to the user voice based on the action sequence by executing a navigation module.

The processor 130 may perform the action corresponding to the user voice in the target node based on at least one parameter. For example, the processor 130 may execute the message window of Peter which is the at least one parameter among message windows which is the target node, input the text Hi, and then click send.

The processor 130 may perform the action corresponding to the user voice by sequentially performing actions in a plurality of second nodes included in the action sequence. For example, the processor 130 may identify an action sequence of moving from the current node to a UI indicating the friend list by executing the route search module, and selecting Peter in the UI indicating the friend list and entering the target node, and perform the actual action based on the action sequence by executing the navigation module. In this case, only one second node may be included between the current node and the target node.

In case it is impossible to perform an action in one node among the plurality of second nodes, the processor 130 may identify a new action sequence from the node wherein it is impossible to perform an action to the target node based on the information on the node wherein it is impossible to perform an action and the target node, and perform the action corresponding to the user voice based on the new action sequence.

For example, the processor 130 identified an action sequence of moving from the current node to the UI indicating the friend list by executing the route search module, and selecting at least one parameter from the UI indicating the friend list and entering the target node, and performed the actual action based on the action sequence by executing the navigation module, but in the actual action process, Peter may not exist in the UI indicating the friend list. In this case, the processor 130 may identify a new action sequence of moving from the UI indicating the friend list to the search menu by executing the route search module, searching at least one parameter, and if there is a search result, clicking the search result and entering the target node, and perform the actual action based on the new action sequence by executing the navigation module. Meanwhile, in this case, if there is no search result in the actual action process, the processor 130 may stop performing of the action on the search result screen.

However, this is merely an example, and the processor 130 may identify whether Peter exists in the process of performing route search by executing the route search module. In this case, if Peter does not exist in the UI indicating the friend list, or there is no search result in the search menu, the processor 130 may provide a message notifying that it is impossible to acquire an action sequence to the user. In contrast, if an action sequence has been acquired, a case wherein the processor 130 stops performing of the action after executing the navigation module may not occur.

The processor 130 may identify the shortest route from the current node to the target node based on the plurality of first nodes and a plurality of first edges corresponding to the plurality of first nodes, and identify an action sequence based on the shortest route.

For example, the processor 130 may identify an action sequence of moving from the current node to the UI indicating the friend list by executing the route search module, and selecting Peter in the UI indicating the friend list and entering the target node. Also, the processor 130 may identify an action sequence of moving from the current node to the search menu, searching at least one parameter, and if there is a search result, clicking the search result and entering the target node. For example, the processor 130 may identify a plurality of routes. If only one node exists between the current node and the target node in the case of the former, two nodes exist between the current node and the target node in the case of the latter, and the processor 130 may identify the action sequence of the former which is the shortest route as the final action sequence.

If the target application has been executed, the processor 130 may identify the current node based on the UI of the target application displayed through the display 120, and if the target application has not been executed, the processor 130 may execute the target application, and identify the current node based on the UI of the target application displayed through the display 120.

For example, if a message application has been executed, the processor 130 may identify the current node based on the UI of the message application displayed through the display 120, and if a message application has not been executed, the processor 130 may execute a message application, and identify the current node based on the UI of the message application displayed through the display 120.

The processor 130 may identify at least one application that can process a user command among a plurality of applications, and identify a target application among the at least one application based on the use frequency of the at least one application.

For example, the processor 130 may identify a message application of the electronic apparatus 100 itself that can process a user command among a plurality of applications, a message application provided by A company, or the like, and identify the message application having the highest use frequency as the target application.

However, the disclosure is not limited thereto, and the processor 130 may identify an application that was finally used as the target application. Alternatively, the processor 130 may identify the target application based on at least one parameter. For example, in case there is a message history with Peter in the message application of the electronic apparatus 100 itself, but there is no message history with Peter in the message application provided by A company, the processor 130 may identify the message application of the electronic apparatus 100 itself as the target application.

If an update of the target application is identified by executing an update module, the processor 130 may update the first UI graph by identifying a new UI among a plurality of UIs provided by the target application as one of the plurality of first nodes or adding the UI as a new node based on the metadata of each of the plurality of UIs provided by the target application by executing the screen analysis module and the screen identification module, identifying a new connective relation among the nodes based on actions that can be performed in each of the plurality of UIs provided by the target application, and executing a graph generation module.

For example, the processor 130 may identify whether the target application has been updated by executing the update module. For example, the processor 130 may identify whether there was an update by checking the version information of the target application by executing the update module. The processor 130 may acquire the first UI graph corresponding to the target application by executing the screen analysis module and the screen identification module, and update the first UI graph by identifying a new UI among the plurality of UIs provided by the target application as one of the plurality of first nodes or adding the UI as a new node based on the metadata of each of the plurality of UIs provided by the target application, identifying a new connective relation among the nodes based on actions that can be performed in each of the plurality of UIs provided by the target application, and executing the graph generation module.

Meanwhile, in the above, a state wherein a UI graph is stored for each application in the memory 110 was assumed. However, the disclosure is not limited thereto, and the processor 130 may directly acquire UI graphs, and store the acquired UI graphs for each application in the memory 110.

The processor 130 may search the plurality of UIs provided by each of the plurality of applications by executing the navigation module. Also, the processor 130 may identify a plurality of UI elements of each of the plurality of UIs provided by each of the plurality of applications and the attributes of each of the plurality of UI elements by executing the screen analysis module in the search process. For example, the processor 130 may acquire the metadata of each of the plurality of UIs provided by each of the plurality of applications, and identify the plurality of UI elements and the attributes of each of the plurality of UI elements based on the metadata. Here, the processor 130 may acquire the metadata of each of the plurality of UIs from an operating system installed in the electronic apparatus 100.

The processor 130 may identify each of the plurality of UIs as one of the plurality of nodes based on the metadata of each of the plurality of UIs provided by each of the plurality of applications by executing the screen identification module, identify a plurality of edges indicating the connective relation among the nodes based on actions that can be performed in each of the plurality of UIs, and execute the graph generation module to acquire the UI graph of each of the plurality of applications.

The processor 130 may identify the plurality of edges indicating the connective relation among the nodes by executing the plurality of UI elements included in each of the plurality of UIs, and convert a predetermined UI element among the plurality of UI elements into a parameter to acquire the UI graph of each of the plurality of applications.

For example, the processor 130 may convert a name, a phone number, or the like, among the plurality of UI elements into parameters.

Meanwhile, some operations among the above operations may be implemented through a neural network model. For example, the screen identification module may be implemented as a neural network model.

Functions related to artificial intelligence according to the disclosure may be operated through the processor 130 and the memory 110.

The processor 130 may consist of one or a plurality of processors. Here, the one or plurality of processors may be a generic-purpose processor, such as a CPU, an AP, a DSP, or the like, a graphics-dedicated processor, such as a GPU and a vision processing unit (VPU), or an artificial intelligence-dedicated processor, such as an NPU.

The one or plurality of processors perform control to process input data according to pre-defined operation rules or an artificial intelligence model stored in the memory 110. Alternatively, in case the one or plurality of processors are artificial intelligence-dedicated processors, the artificial intelligence-dedicated processors may be designed as a hardware structure specified for processing of a specific artificial intelligence model. Meanwhile, the pre-defined operation rules or the artificial intelligence model are characterized in that they are made through learning.

Here, being made through learning means that predefined operation rules or an artificial intelligence model set to perform desired characteristics (or, purposes) are made as a basic artificial intelligence model is trained by a learning algorithm by using a plurality of learning data. Such learning may be performed in an apparatus itself wherein artificial intelligence is performed according to the disclosure, or performed through a separate server/system. As examples of learning algorithms, there are supervised learning, unsupervised learning, semi-supervised learning, or reinforcement learning, but learning algorithms in the disclosure are not limited to the aforementioned examples.

An artificial intelligence model may consist of a plurality of neural network layers. Each of the plurality of neural network layers has a plurality of weight values, and performs a neural network operation through the operation result of the previous layer and an operation among the plurality of weight values. The plurality of weight values included by the plurality of neural network layers may be optimized by the learning result of the artificial intelligence model. For example, the plurality of weight values may be updated such that a loss value or a cost value acquired at the artificial intelligence model during a learning process is reduced or minimized.

An artificial neural network may include a deep neural network (DNN), and for example, there are a convolutional neural network (CNN), a deep neural network (DNN), a recurrent neural network (RN), a restricted. Boltzmann machine (RBM), a deep belief network (DBN), a bidirectional recurrent deep neural network (BRDNN), a generative adversarial network (GAN), or deep Q-networks, or the like, but the disclosure is not limited thereto.

Figure 3:
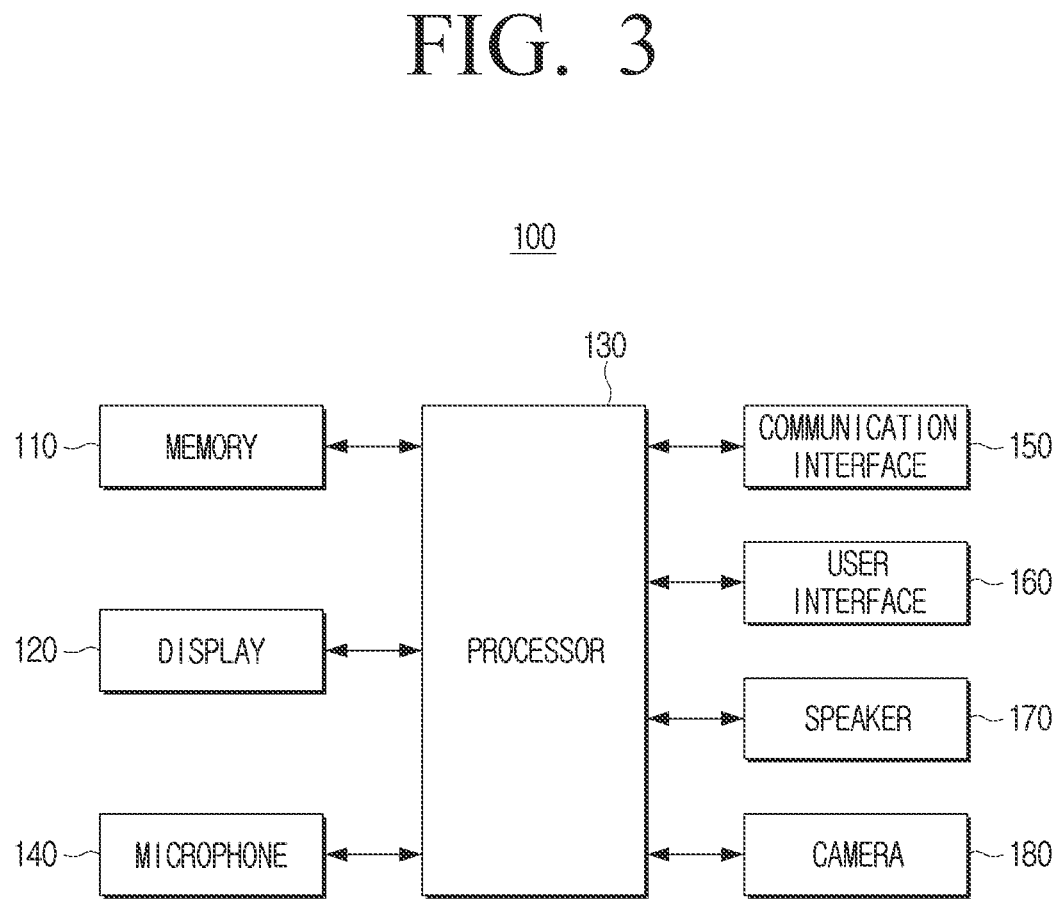

FIG. 3 is a block diagram illustrating a configuration of an electronic apparatus according to an embodiment of the disclosure. The electronic apparatus 100 may include a memory 110, a display 120, and a processor 130.

Referring to FIG. 3, the electronic apparatus 100 may further include a microphone 140, a communication interface 150, a user interface 160, a speaker 170, and a camera 180. Among the components illustrated in FIG. 3, regarding parts that overlap with the components illustrated in FIG. 1, detailed explanation will be omitted.

The microphone 140 is a component for receiving input of a sound and converting the sound into an audio signal. The microphone 140 may be electrically connected with the processor 130, and receive a sound by control by the processor 130.

For example, the microphone 140 may be formed as an integrated type integrated to the upper side or the front surface direction, the side surface direction, or the like, of the electronic apparatus 100. Alternatively, the microphone 140 may be included in a remote control, or the like, separate from the electronic apparatus 100. In this case, the remote control may receive a sound through the microphone 140, and provide the received sound to the electronic apparatus 100.

The microphone 140 may include various components, such as a microphone collecting a sound in an analogue form, an amp circuit amplifying the collected sound, an analogue-to-digital (A/D) conversion circuit that samples the amplified sound and converts the sound into a digital signal, a filter circuit that removes noise components from the converted digital signal, or the like.

Meanwhile, the microphone 140 may be implemented in a form of a sound sensor, and it can be in any method if it is a component that can collect a sound.

The communication interface 150 is a component that performs communication with external apparatuses in various types according to communication methods in various types. For example, the electronic apparatus 100 may perform communication with a server, a home appliance, or the like, through the communication interface 150.

The communication interface 150 may include a wireless fidelity (Wi-Fi) module, a Bluetooth module, an infrared communication module, and a wireless communication module, or the like. Here, each communication module may be implemented in a form of at least one hardware chip.

A Wi-Fi module and a Bluetooth module perform communication by a Wi-Fi method and a Bluetooth method, respectively. In the case of using a Wi-Fi module or a Bluetooth module, various types of connection information, such as a service set identifier (SSID) and a session key is transmitted and received first, and connection of communication is performed by using the information, and various types of information can be transmitted and received thereafter. Meanwhile, an infrared communication module performs communication according to an infrared data association (IrDA) technology of transmitting data to a near field wirelessly by using infrared rays between visible rays and millimeter waves.

A wireless communication module may include at least one communication chip that performs communication according to various wireless communication protocols, such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, other than the aforementioned communication methods.

Alternatively, the communication interface 150 may include a wired communication interface, such as a high-definition multimedia interface (HDMI), a display port (DP), a Thunderbolt, a universal serial bus (USB), a red, green, blue (RGB), a D-subminiature (D-SUB), a digital visual interface (DVI), or the like.

Other than the above, the communication interface 150 may include at least one of a local area network (LAN) module, an Ethernet module, or a wired communication module that performs communication by using a pair cable, a coaxial cable, or an optical fiber cable, or the like.

The user interface 160 may be implemented as a button, a touch pad, a mouse, and a keyboard, or implemented as a touch screen that can perform both of a display function and a manipulation input function. Here, a button may be various types of buttons, such as a mechanical button, a touch pad, a wheel, or the like, formed in any areas, such as the front surface part or the side surface part, the rear surface part, or the like, of the exterior of the main body of the electronic apparatus 100.

The speaker 170 is a component that outputs not only various kinds of audio data processed at the processor 130, but also various kinds of notification sounds or voice messages, or the like.

Other than the above, the electronic apparatus 100 may further include a camera 180. The camera 180 is a component for photographing a still image or a moving image. The camera 180 may photograph a still image on a specific time point, but it may also continuously photograph still images.

The camera 180 may photograph the front side of the electronic apparatus 100, and photograph the user who is viewing the electronic apparatus 100. The processor 130 may identify an area wherein a content will be output based on the image of the user photographed through the camera 180.

The camera 180 includes a lens, a shutter, an aperture, a solid imaging element, an analog front end (AFE), and a timing generator (TG). The shutter adjusts the time when a light reflected on a subject comes into the camera 180, and the aperture adjusts the light amount introduced into the lens by mechanically increasing or decreasing the size of the opening through which the light comes in. When the light reflected on the subject is accumulated as photocharges, the solid imaging element outputs a phase by the photocharges into an electric signal. The TG outputs a timing signal for reading out pixel data of the solid imaging element, and the AFE samples the electric signal output from the solid imaging element and digitalizes it.

As described above, the electronic apparatus 100 may perform an action corresponding to a user voice by using a UI graph for each application. Also, the electronic apparatus 100 may parameterize some elements, and can thereby perform an adaptive action while reducing the capacity of a UI graph.

Hereinafter, operations of the electronic apparatus 100 will be explained with reference to FIGS. 4 to 13. In FIGS. 4 to 13, individual embodiments will be explained for the convenience of explanation. However, the individual embodiments in FIGS. 4 to 13 can be carried out in any combined states.

Figure 4:
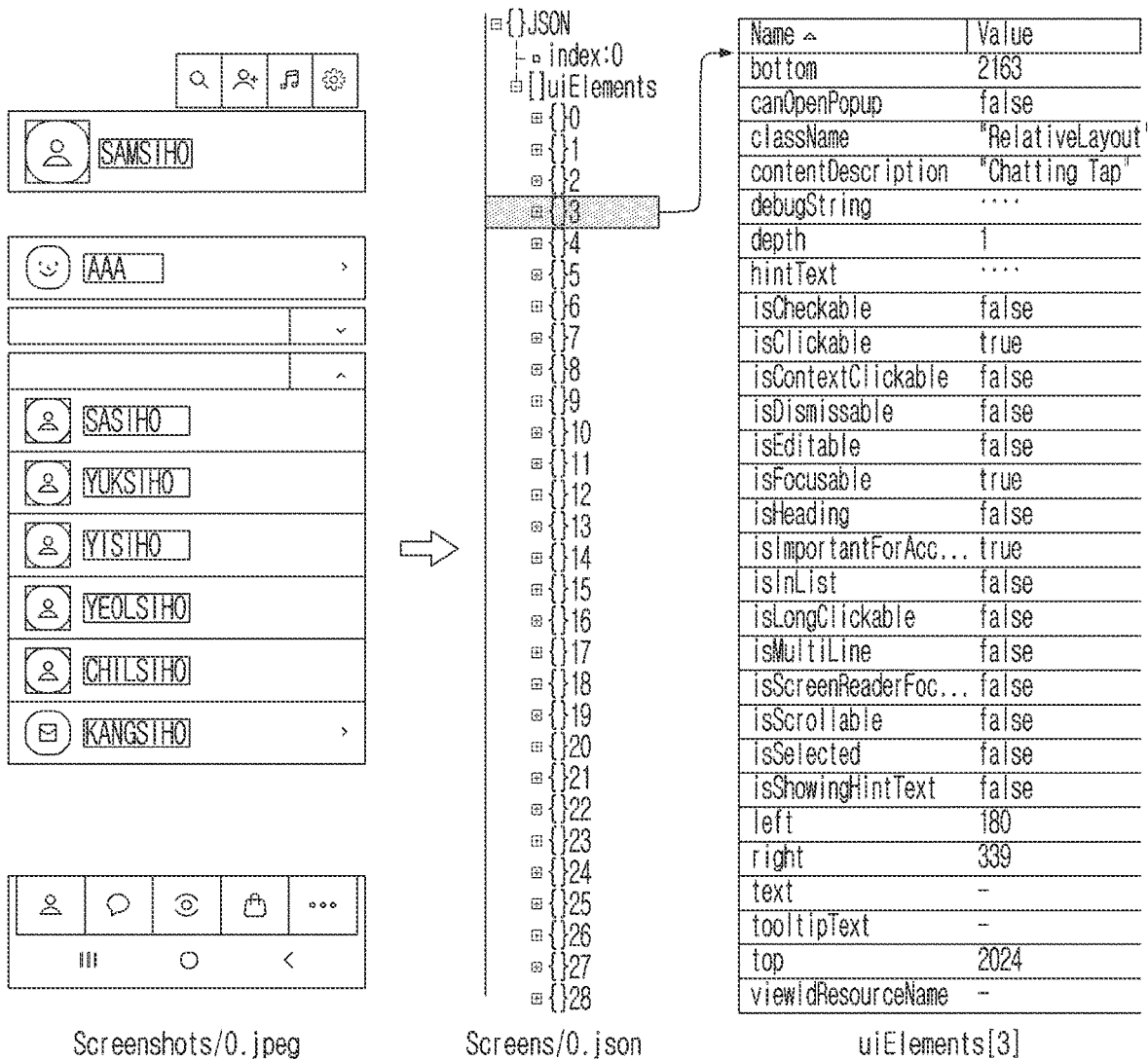
FIG. 4 is a diagram for illustrating a configuration of a user interface (UI) according to an embodiment of the disclosure.

FIG. 4 is a diagram for illustrating a configuration of a user interface (UI) according to an embodiment of the disclosure.

Referring to FIG. 4, an application may provide a plurality of UIs. Each of the plurality of UIs may include a plurality of UI elements. For example, an application may provide a UI including a contact list as illustrated on the left side of FIG. 4. The UI including a contact list may include UI elements, such as "Sasiho," "Yuksiho," or the like.

Each of the plurality of UI elements may include various attributes, such as isClickable, bounding box, or the like. Information on such attributes may be acquired through an operation of directly clicking, or the like, or acquired from metadata. For example, the processor 130 may acquire metadata as in the center and on the right side of FIG. 4 from the operating system installed in the electronic apparatus 100. First, the center of FIG. 4 includes information on the plurality of UI elements included in the UI as on the left side of FIG. 4, and the right side of FIG. 4 may include detailed information when one of the plurality of UI elements is selected.

The processor 130 may identify similarity between the UIs by comparing the information as in the center and on the right side of FIG. 4 between the UIs. For example, if it is determined that the first UI and the second UI are similar, the processor 130 may identify the first UI and the second UI as the same UI type, and one UI type may form a UI graph as one node.

FIG. 5 is a diagram for illustrating edges indicating a connective relation among nodes according to an embodiment of the disclosure.

Referring to FIG. 5, a processor 130 may identify the connective relation among the nodes by executing each of the plurality of UI elements, and form a UI with the connective relation among the nodes as the edges.

Referring to FIG. 5, sourceScreenIndex:0 indicates a UI before an action, { }eventUiElement indicates a UI element inducing an action, actionType:"ACTION_CLICK" indicates the type of the action, and destScreenIndex:1 indicates the UI after the action. For example, FIG. 5 means entering No. 1 UI from the No. 0 UI according to click of a UI element instructed by { }eventUiElement.

A UI graph may include the plurality of nodes as in FIG. 4 and the plurality of edges as in FIG. 5 indicating the connective relation among the nodes based on actions that can be performed in the plurality of nodes. Also, a UI graph may be provided for each application.

Figure 6:
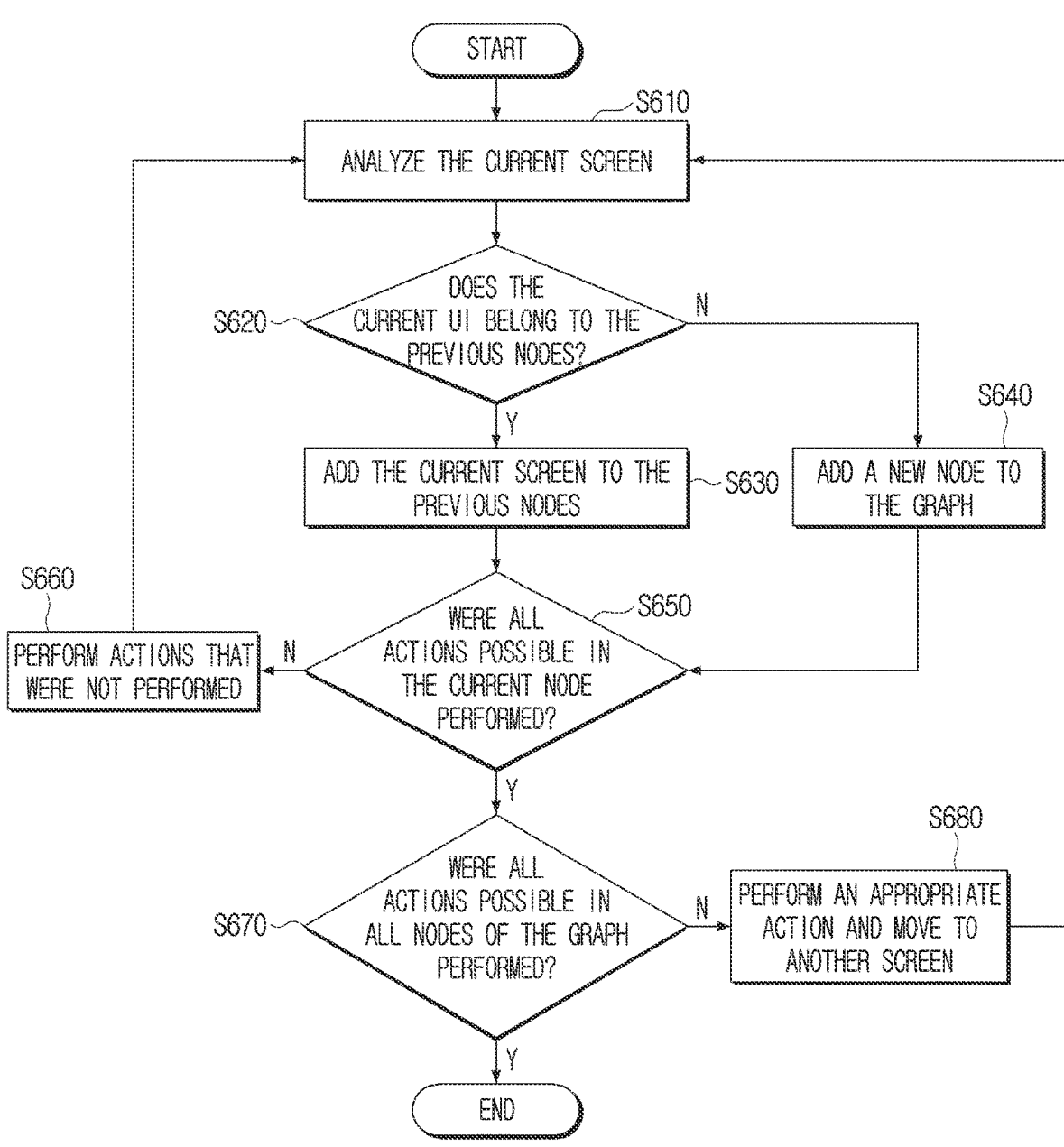
FIGS. 6 and 7 are diagrams for illustrating a method of acquiring a UI graph according to various embodiments of the disclosure.
Figure 7:
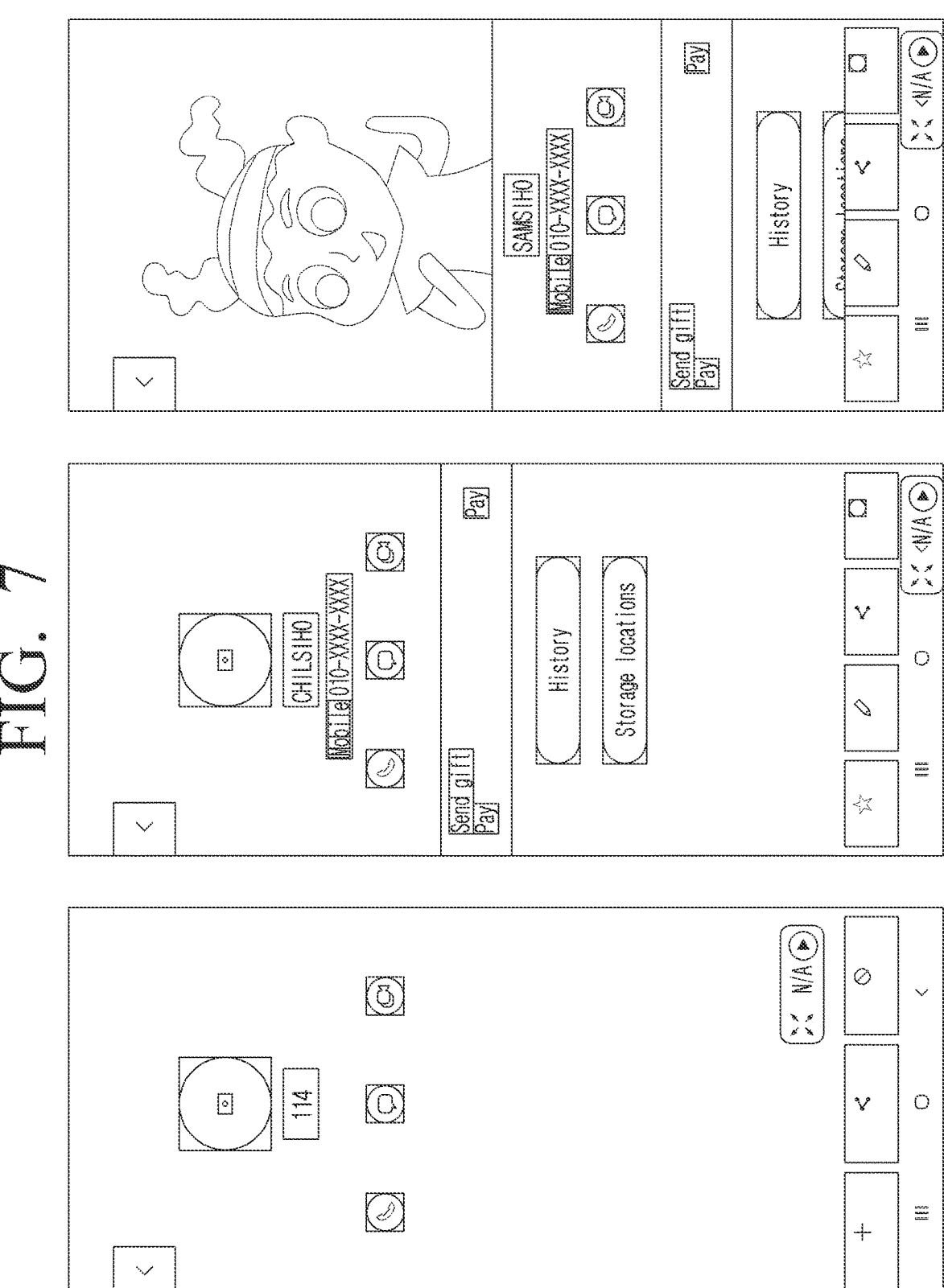

FIGS. 6 and 7 are diagrams for illustrating a method of acquiring a UI graph according to various embodiments of the disclosure.

Referring to FIGS. 6 and 7, a processor 130 may analyze the current UI (screen) by executing the screen analysis module in operation S610. For example, if a new application is installed, the processor 130 may execute the new application and display the UI provided by the new application, and analyze the current UI.

The processor 130 may analyze the current UI, and identify a plurality of UI elements included in the current UI and the attributes of each UI element. Here, the attributes of the UI elements may include isClickable, bounding box, text, or the like.

The processor 130 may identify whether the current UI belongs to the previous nodes by executing the screen identification module in operation S620. In case the current UI belongs to the previous nodes, the processor 130 may add the current UI to the previous nodes in operation S630, and in case the current UI does not belong to the previous nodes, the processor 130 may add a new node to the UI graph in operation S640.

For example, the processor 130 may identify the similarity between the UIs by identifying the similarity between the UI hierarchy of the plurality of UI elements included in each UI and a set of the plurality of UI elements. For example, the processor 130 may identify the similarity between the UIs through methods, such as jaccard similarity, metric learning, or the like. In this case, the processor 130 may respond to updates of various applications without a change of the algorithm.

Alternatively, in case there is a designated node set to be considered, the processor 130 may train a classifier model classifying a UI as one of the nodes, and use it. In this case, it may be difficult to respond in case some UIs were changed by an update of an application.

Here, if the similarity is greater than or equal to a predetermined value, the processor 130 may identify the current node as one of the previous nodes even if the current UI and the previous nodes are not completely identical.

Referring to FIG. 7, there may be a difference in the three UIs in the constitution of the screens, but as the metadata of the three UIs has quite high similarity, the processor 130 may identify the three UIs as one node. In case it is processed that the screen variations are all different, the number of the nodes will become excessively big, and thus the UI graph will become bigger which will be inefficient, but the number of the nodes can be reduced through an operation as above, and thus it is possible to generate an effective UI graph.

However, the disclosure is not limited thereto, and the processor 130 may acquire a screen shot of each UI, identify the similarity between two screen shots through a method, such as cosine similarity between image embedding vectors, and identify the similarity between the UIs based on the identified similarity. Alternatively, the processor 130 may identify the similarity between the UIs based on whether there is a predetermined layout or a predetermined UI element. For example, in case a UI includes a profile photo, a name, a call button, a text button, or the like, the processor 130 may identify the UI as a profile page.

Referring to FIG. 6, the processor 130 may identify whether all actions that are possible in the current node were performed in operation S650. Here, an action means an interaction, such as a click, a description of a text, or the like, that can be performed in a UI element.

In case all actions that are possible in the current node were not performed, the processor 130 may perform actions that were not performed in operation S660, and return to the operation S610.

In case all actions that are possible in the current node were performed, the processor 130 may identify whether all actions possible in all nodes of the UI graph were performed in operation S670.

In case all actions that are possible in all nodes of the UI graph were not performed, the processor 130 may perform an appropriate action and move to another UI in operation S680, and return to the operation S610.

In case all actions that are possible in all nodes of the UI graph were performed, the processor 130 may complete the action of acquiring the UI graph.

Meanwhile, the processor 130 may convert some of UI elements included in a UI into parameters in a process of classifying the UI into a node. For example, the processor 130 may parameterize "visit Chulsoo's chat room" to "visit XX's chat room." For example, the processor 130 may generate a graph including a route reaching Chulsoo's chat room, and then parameterize "Chulsoo." In this case, the processor 130 can perform an adaptive operation, such as "visit Youngsoo's chat room."

The processor 130 may identify portions in UIs included in the same node wherein similar attributes, such as the locations on the screens, the types, or the like, are shared but different values are placed for each UI, and convert these portions into parameters. For example, if a text field having an internal id "username" appears in all screens and have different values, such as "Chulsoo," "Youngsoo," "Minsoo," or the like, for each screen, the processor 130 may parameterize this text field. However, the disclosure is not limited thereto, and the processor 130 may parameterize an image by a similar method.

Figure 8:
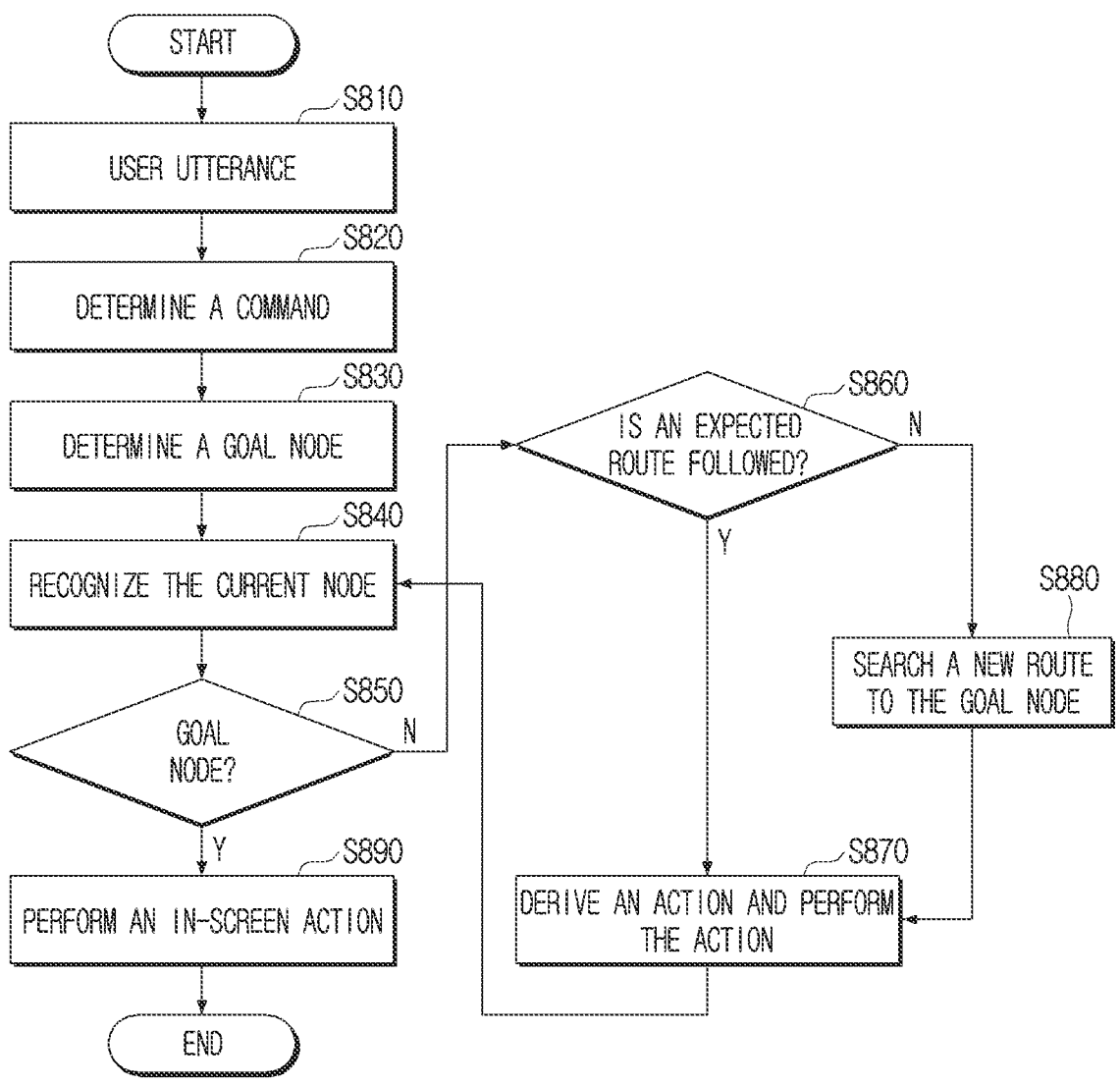
FIG. 8 is a flow chart for illustrating an action according to a user voice according to an embodiment of the disclosure.

FIG. 8 is a flow chart for illustrating an action according to a user voice according to an embodiment of the disclosure.

Referring to FIG. 8, if a user voice is received by executing the ASR/NLU module in operation S810, the processor 130 may perform natural language understanding for the user voice and determine a user command included in the user voice in operation S820.

The processor 130 may determine a target node based on the user command by executing the target node identification module in operation S830. Then, the processor 130 may identify the current node corresponding to a UI displayed through the display 120 by executing the screen analysis module and the screen identification module in operation S840.

The processor 130 may identify whether the current node is the target node by executing the route search module and the navigation module in operation S850, and if the current node is not the target node, identify whether an expected route is followed in operation S860. In case the expected route is followed, the processor 130 may derive an action and perform the action in operation S870, and in case the expected route is not followed, the processor 130 may search a new route to the target node in operation S880, and derive an action and perform the derived action in operation S870.

After performing the action, the processor 130 may re-identify the current node by executing the screen analysis module and the screen identification module in operation S840.

The processor 130 may repeat the action as above until the re-identified current node becomes the target node, and if the current node is the target node, the processor 130 may perform an action corresponding to the user voice in the target node in operation S890. For example, the processor

130 may perform an action in the target node, such as clicking the like button and inputting a text into the search window, or the like.

Meanwhile, the processor 130 may select different routes according to the operation set supported by the current UI. For example, if a user voice for moving to a friend's profile page is received, the processor 130 may move to the friend list tap, and in case there is the friend on the current UI, the processor 130 may select the friend and move to the friend's profile page. Alternatively, if a user voice for moving to a friend's profile page is received, the processor 130 may move to the friend list tap, and in case the friend is not on the current UI, the processor 130 may move to the search menu and search the friend's name. In case there is a search result, the processor 130 may select the friend and move to the friend's profile page, and in case there is no search result, the processor 130 may stop navigation on the search result screen.

For example, even if the same user voice is received, the action sequence may vary according to the context.

Figure 9:
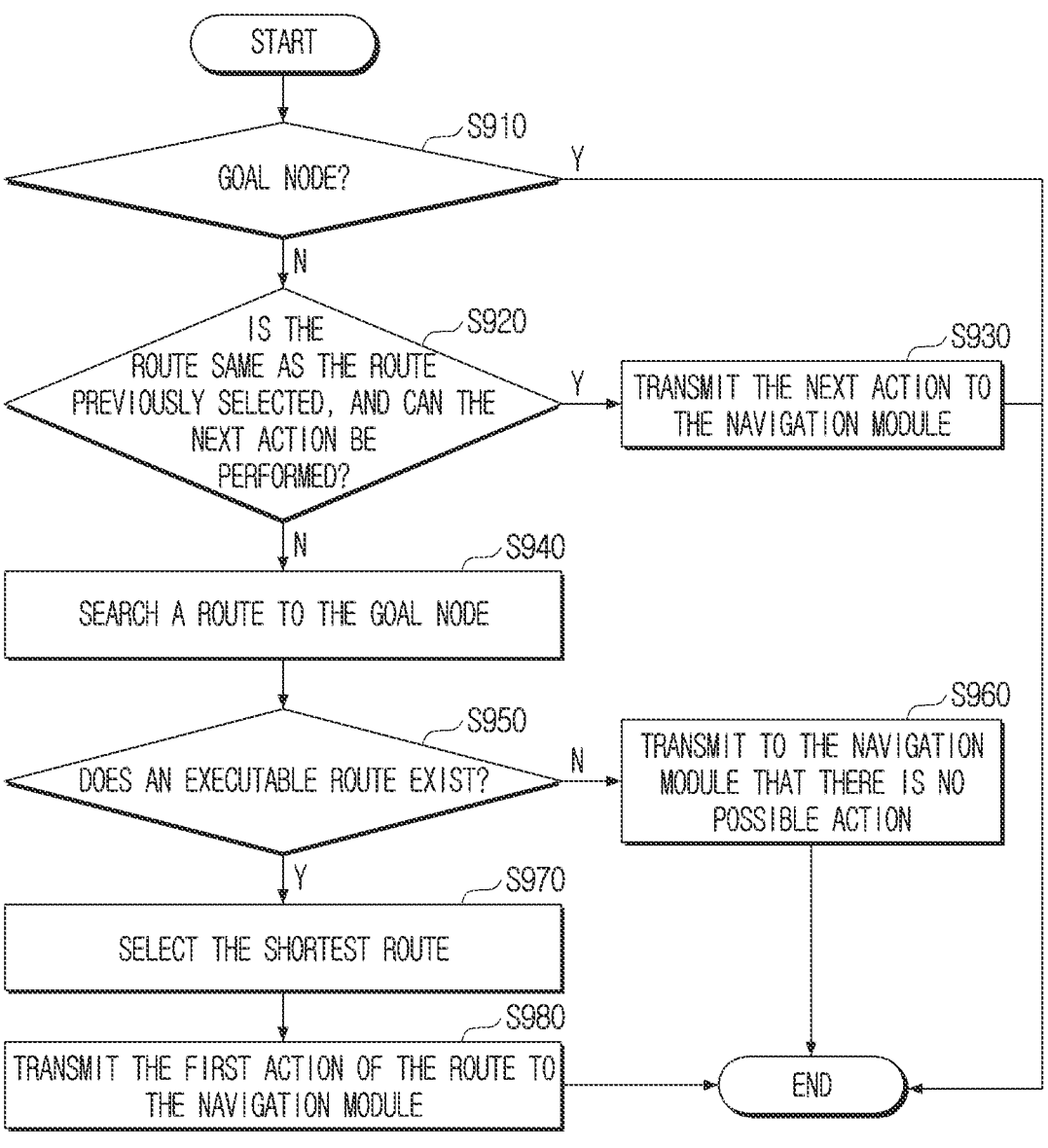
FIG. 9 is a flow chart for illustrating an action sequence according to an embodiment of the disclosure.

FIG. 9 is a flow chart for illustrating an action sequence according to an embodiment of the disclosure.

Referring to FIG. 9, first, the processor 130 may identify whether the current node is the target node in operation S910, and if the current node is the target node, the processor 130 may finish the action of identifying the action sequence, and if the current node is not the target node, identify whether the route is the same as the route that was previously selected, and whether it is possible to perform the next action in operation S920.

In case the route is the same as the route that was previously selected, and it is possible to perform the next action, the processor 130 may transmit the next action to the navigation module in operation S930, and in case the route is different from the route that was previously selected, and it is impossible to perform the next action, the processor 130 may search a route to the target node in operation S940. For example, the processor 130 may search a route to the target node through a route search algorithm, such as breadth-first search (BFS), depth first search (DFS), or the like. Here, the processor 130 may exclude a route that cannot be executed on the current UI, such as a case wherein a friend wanted is not on the friend list.

The processor 130 may identify whether an executable route exists in operation S950. In case an executable route does not exist, the processor 130 may transmit to the navigation module that there is no possible action in operation S960, and in case an executable route exists, the processor 130 may select the shortest route in operation S970. However, the disclosure is not limited thereto, and the processor 130 may not select the shortest route. For example, the processor 130 may select a route which is not the shortest route based on a predetermined standard. For example, in case an advertisement should be viewed on the first route which is the shortest route, but an advertisement does not have to be viewed on the second route longer than the first route, the processor 130 may select the second route.

After selecting the shortest route, the processor 130 may transmit the first action of the route to the navigation module in operation S980. Meanwhile, in case the route becomes different from the route that was selected when executing an action, or the next action cannot be performed even though the route is the same, the processor 130 may proceed with the operation S940.

Figure 10:
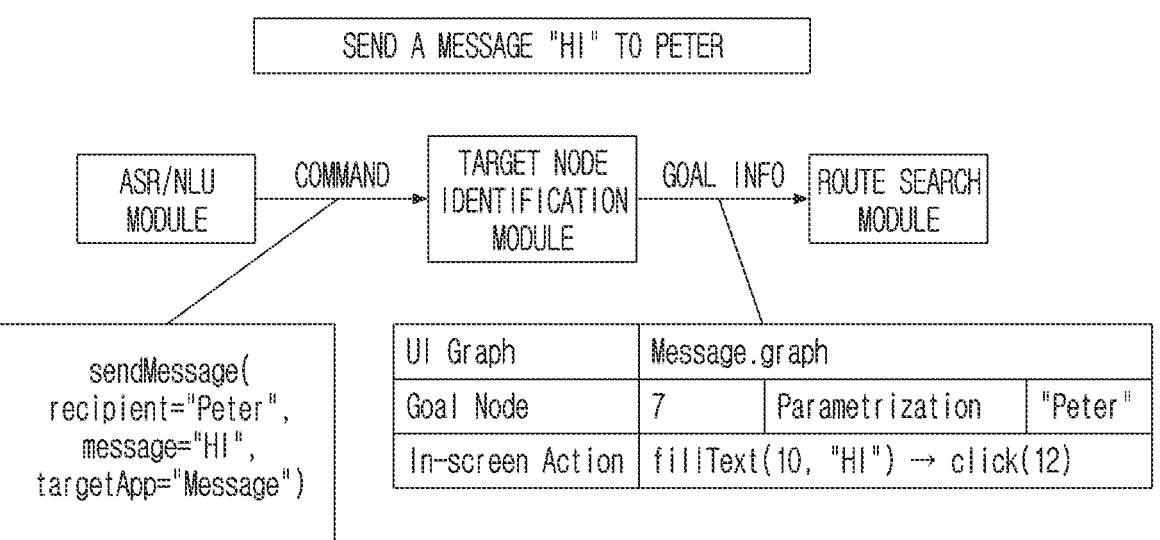

FIGS. 10 and 11 are diagrams for illustrating an action according to a user voice according to various embodiments of the disclosure.

Referring to FIG. 10, the processor 130 may receive a user voice, such as "Send a message "Hi" to Peter." In this case, the processor 130 may identify a user command, such as sendMessage from the user voice by executing the ASR/NLU module, identify Peter as at least one parameter, and identify "Hi" as the message, and identify a message application as the target application. Then, the processor 130 may provide the information acquired through the ASR/NLU module to the target node identification module.

The processor 130 may identify Message.graph as a UI graph corresponding to the target application by executing the target node identification module, identify the target node as No. 7 node, identify Peter as at least one parameter, and identify an action of inputting "Hi" as a text and clicking as the action in the target node. The processor 130 may provide the information acquired through the target node identification module to the route search module.

Referring to FIG. 11, the processor 130 may receive a user voice, such as "Send a message "Hi" to Peter and then block him." In this case, the processor 130 may acquire information on a user command, such as sendMessage, or the like, as in FIG. 10 from the user voice by executing the ASR/NLU module. Also, the processor 130 may identify a user command, such as block, and identify Peter as at least one parameter. The processor 130 may provide the information acquired through the ASR/NLU module to the target node identification module.

The processor 130 may identify information on Message-.graph, or the like, as in FIG. 10 by executing the target node identification module. Also, the processor 130 may identify Message.graph as a UI graph corresponding to the target application based on block, identify the target node as No. 8 node, and identify Peter as at least one parameter. The processor 130 may provide the information acquired through the target node identification module to the route search module.

Meanwhile, in case the current node is not identified from the displayed UI, the processor 130 may execute the target application corresponding to the user voice, and in case the target application has been executed, the processor 130 may move to a UI classified into a node through an external control of the application (e.g., a back button, restart of the application, or the like).

If a user voice without a target node is received, the processor 130 may provide a message that an action cannot be performed, and finish the process.

Figure 13:
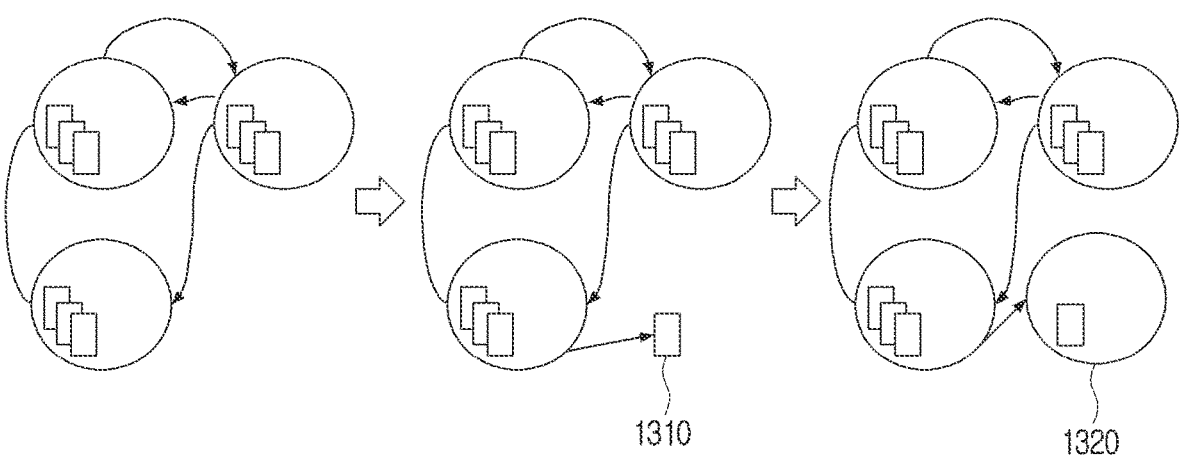

FIGS. 12 and 13 are diagrams for illustrating an updating operation of a UI graph according to various embodiments of the disclosure.

Referring to FIG. 12, the processor 130 may identify an update of an application in an application store in operation S1205, and identify whether the application was updated in operation S1210.

In case the application was updated, the processor 130 may load a UI graph in operation S1215, and analyze the current UI in operation S1220.

The processor 130 may identify whether the current UI belongs to the previous nodes in operation S1225, and in case the current UI belongs to the previous nodes, the processor 130 may add the current UI to the previous nodes in operation 51230, and in case the current UI does not belong to the previous nodes, the processor 130 may add a new node to the UI graph in operation S1235.

After performing an action, the processor 130 may identify whether the current UI is identical to the action result in the previous UI graph in operation S1240, and in case the current UI is identical, the processor 130 may identify whether all actions that are possible in the current UI were performed in operation S1245, and in case the current UI is not identical, the processor 130 may update the edges in operation S1250, and identify whether all actions that are possible in the current UI were performed in operation S1245.

In case all actions that are possible in the current UI were not performed, the processor 130 may perform actions that were not performed in operation S1255, and return to the operation S1220, and in case all actions that are possible in the current UI were performed, the processor 130 may identify whether all actions that are possible in all nodes of the UI graph were performed in operation S1260.

In case all actions that are possible in all nodes of the UI graph were not performed, the processor 130 may perform an appropriate action and move to another UI in operation S1265, and return to the operation S1220, and in case all actions that are possible in all nodes of the UI graph were performed, the processor 130 may finish the update action of the UI graph.

Referring to FIG. 13, if a new UI is identified in the previous UI graph as on the left side of FIG. 13, the processor 130 may add a new node 1310 as in the center of FIG. 13, and connect the edges to the new node in operation 1320 as on the right side of FIG. 13.

Figure 14:
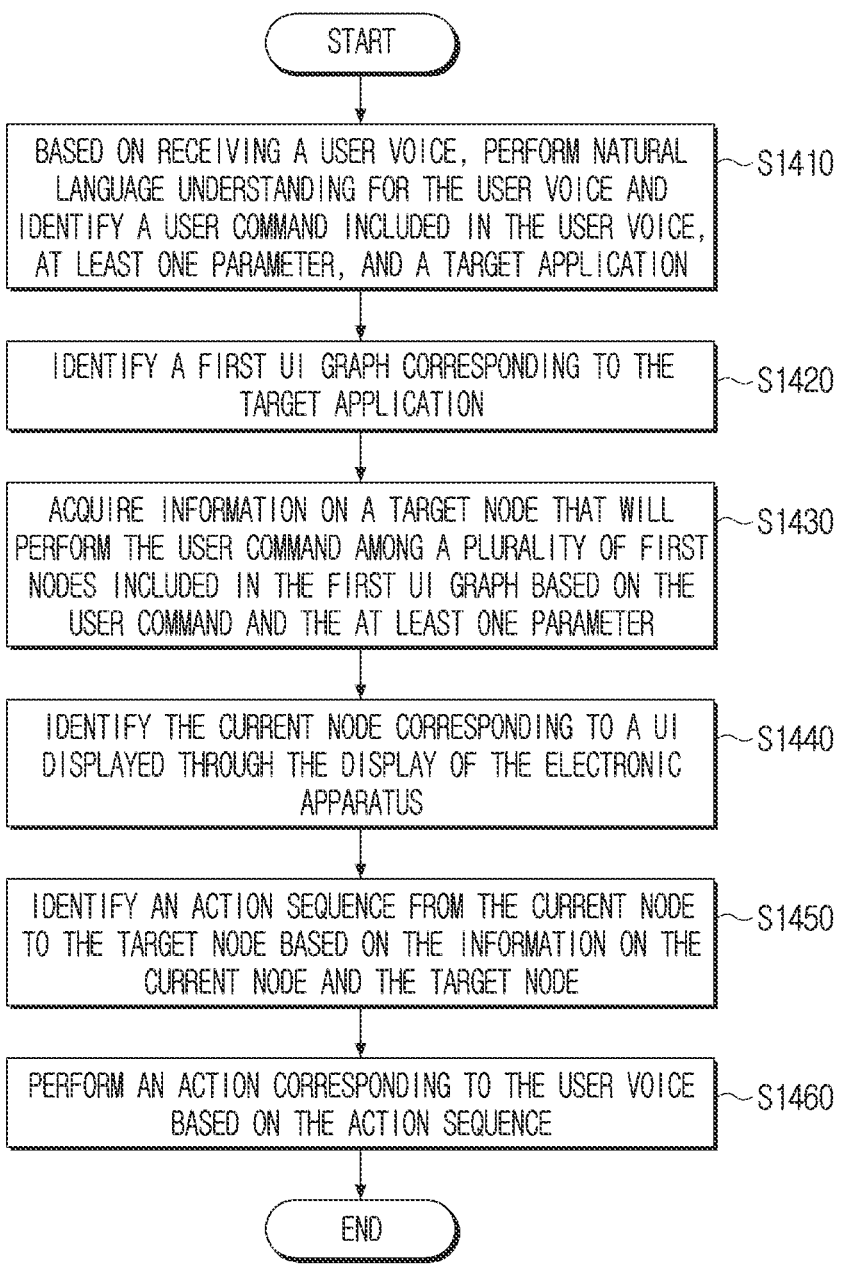
FIG. 14 is a flow chart for illustrating a method of controlling an electronic apparatus according to an embodiment of the disclosure.

FIG. 14 is a flow chart for illustrating a method of controlling an electronic apparatus according to an embodiment of the disclosure.

Referring to FIG. 14, in a method of controlling an electronic apparatus wherein a plurality of nodes corresponding to a plurality of UI types provided by an application and a UI graph including a plurality of edges indicating the connective relation among the nodes based on actions that can be performed in the plurality of nodes are stored for each application, first, if a user voice is received, natural language understanding for the user voice is performed and a user command included in the user voice, at least one parameter, and a target application are identified in operation S1410. Then, a first UI graph corresponding to the target application is identified in operation S1420. Then, information on a target node that will perform the user command among a plurality of first nodes included in the first UI graph is acquired based on the user command and the at least one parameter in operation S1430. Then, the current node corresponding to a UI displayed through a display of the electronic apparatus is identified in operation S1440.

Then, an action sequence from the current node to the target node is identified based on the information on the current node and the target node in operation S1450. Then, an action corresponding to the user voice is performed based on the action sequence in operation S1460. Here, the information on the target node includes identification information for the target node that will perform the user command, action information corresponding to the user command to be performed in the target node, and information on the at least one parameter.

Here, in the performing operation S1460, the action corresponding to the user voice may be performed in the target node based on the at least one parameter.

Also, in the performing operation S1460, the action corresponding to the user voice may be performed by sequentially performing operations in a plurality of second nodes included in the action sequence.

Here, in the performing operation S1460, in case it is impossible to perform an operation in one node among the plurality of second nodes, a new action sequence from the node wherein it is impossible to perform an action to the target node may be identified based on the information on the node wherein it is impossible to perform an action and the target node, and the action corresponding to the user voice may be performed based on the new action sequence.

Also, in the performing operation S1460, the shortest route from the current node to the target node may be identified based on the plurality of first nodes and a plurality of first edges corresponding to the plurality of first nodes, and the action sequence may be identified based on the shortest route.

Meanwhile, in the operation S1440 of identifying the current node, if the target application have been executed, the current node may be identified based on the UI of the target application displayed through the display, and if the target application has not been executed, the target application may be executed, and the current node may be identified based on the UI of the target application displayed through the display.

Also, in the operation S1410 of identifying the target application, at least one application that can process the user command may be identified among a plurality of applications, and the target application may be identified among the at least one application based on the use frequency of the at least one application.

Meanwhile, the method may further include the steps of, if an update of the target application is identified, updating the first UI graph by identifying a new UI among a plurality of UIs provided by the target application as one of the plurality of first nodes or adding the UI as a new node based on the metadata of each of the plurality of UIs provided by the target application, and identifying a new connective relation among the nodes based on operations that can be performed in each of the plurality of UIs provided by the target application.

Also, the method may further include the steps of, based on the metadata of each of a plurality of UIs provided by each of a plurality of applications, identifying each of the plurality of UIs as one of the plurality of nodes, and identifying the plurality of edges indicating the connective relation among the nodes based on operations that can be performed in each of the plurality of UIs to acquire a UI graph of each of the plurality of applications.

Here, in the step of acquiring the UI graph, the plurality of edges indicating the connective relation among the nodes may be executed by executing a plurality of UI elements included in each of the plurality of UIs, and a predetermined UI element among the plurality of UI elements may be converted into a parameter to acquire the UI graph of each of the plurality of applications.

Also, in the step of acquiring the UI graph, the metadata of each of the plurality of UIs may be acquired from an operating system installed in the electronic apparatus.

According to one or more embodiments of the disclosure as described above, an electronic apparatus can perform an action corresponding to a user voice by using a UI graph for each application.

Also, the electronic apparatus may parameterize some elements, and can thereby perform an adaptive action while reducing the capacity of a UI graph.

Meanwhile, according to one or more embodiments of the disclosure, the aforementioned various embodiments may be implemented as software including instructions stored in machine-readable storage media, which can be read by machines (e.g.: computers). The machines refer to apparatuses that call instructions stored in a storage medium, and can operate according to the called instructions, and apparatuses may include an electronic apparatus according to the aforementioned embodiments (e.g.: an electronic apparatus A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to one or more embodiments of the disclosure, methods according to the aforementioned various embodiments may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed on-line through an application store (e.g.: Play Store™). In the case of on-line distribution, at least a portion of a computer program product may be stored in a storage medium, such as the server of the manufacturer, the server of the application store, and the memory of the relay server at least temporarily, or may be generated temporarily.

In addition, according to one or more embodiments of the disclosure, the aforementioned various embodiments may be implemented in a recording medium that can be read by a computer or an apparatus similar to a computer, by using software, hardware, or a combination thereof. In some cases, the embodiments described in this specification may be implemented as a processor itself. According to implementation by software, the embodiments, such as procedures and functions described in this specification may be implemented as separate software. Each software can perform one or more functions and actions described in this specification.

Meanwhile, computer instructions for performing processing operations of an apparatus according to the aforementioned various embodiments may be stored in a non-transitory computer-readable medium. Computer instructions stored in such a non-transitory computer-readable medium make the processing operations at the apparatus according to the aforementioned various embodiments performed by a specific machine, when the instructions are executed by the processor of the specific machine. A non-transitory computer-readable medium refers to a medium that stores data semi-permanently, and is readable by machines, but not a medium that stores data for a short moment, such as a register, a cache, and a memory. As specific examples of a non-transitory computer-readable medium, there may be a compact disc (CD), a digital versatile disc (DVD), a hard disc, a blue-ray disc, a USB, a memory card, a ROM and the like.

In addition, each of the components (e.g.: a module or a program) according to the aforementioned various embodiments may consist of a singular object or a plurality of objects. Also, among the aforementioned corresponding sub components, some sub components may be omitted, or other sub components may be further included in the various embodiments. Alternatively or additionally, some components (e.g.: a module or a program) may be integrated as an object, and perform functions performed by each of the components before integration identically or in a similar manner. Further, operations performed by a module, a program, or other components according to the various embodiments may be executed sequentially, in parallel, repetitively, or heuristically. Or, at least some of the operations may be executed in a different order or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:

memory storing a plurality of nodes corresponding to a plurality of user interface (UI) types provided by an application and a UI graph, for each application of a plurality of applications, including a plurality of edges indicating a connective relation among the plurality of nodes based on actions that can be performed in the plurality of nodes;

a display; and at least one processor connected with the memory and the display, wherein the at least one processor is configured to:

based on receiving a user voice, perform natural language understanding (NLU) for the user voice and identify a user command included in the user voice, at least one parameter, and a target application, identify a first UI graph corresponding to the target application, acquire information on a target node that will perform the user command among a plurality of first nodes included in the first UI graph based on the user command and the at least one parameter, wherein the information on the target node includes identification information for the target node that will perform the user command, action information corresponding to the user command to be performed in the target node, and information on the at least one parameter, identify a current node corresponding to a UI displayed through the display, identify an action sequence from the current node to the target node based on information on the current node and the information on the target node, and perform an action corresponding to the user voice based on the action sequence, and wherein, to acquire the UI graph of each application of the plurality of applications, the at least one processor is further configured to:

identify the plurality of edges indicating the connective relation among the plurality of nodes by executing a plurality of UI elements included in each of a plurality of UIs provided by each application of the plurality of applications, and convert a predetermined UI element among the plurality of UI elements into a parameter to acquire the UI graph of each application of the plurality of applications and thereby reduce a capacity of at least one UI graph from among the UI graph of each application of the plurality of applications.

2. The electronic apparatus of claim 1, wherein the at least one processor is further configured to:

perform the action corresponding to the user voice in the target node based on the at least one parameter.

3. The electronic apparatus of claim 1, wherein the at least one processor is further configured to:

perform the action corresponding to the user voice by sequentially performing actions in a plurality of second nodes included in the action sequence.

4. The electronic apparatus of claim 3, wherein the at least one processor is further configured to:

based on it being impossible to perform at least one action in one node among the plurality of second nodes, identify a new action sequence from the one node in which it is impossible to perform the at least one action to the target node based on information on the one node in which it is impossible to perform the at least one action and the information of the target node; and perform the action corresponding to the user voice based on the new action sequence.

5. The electronic apparatus of claim 3, wherein the at least one processor is further configured to:

identify a shortest route from the current node to the target node based on the plurality of first nodes and a plurality of first edges corresponding to the plurality of first nodes; and identify the action sequence based on the shortest route.

6. The electronic apparatus of claim 1, wherein the at least one processor is further configured to:

based on the target application having been executed, identify the current node based on a UI of the target application displayed through the display; and based on the target application not having been executed, execute the target application, and identify the current node based on the UI of the target application displayed through the display.

7. The electronic apparatus of claim 1, wherein the at least one processor is further configured to:

identify at least one application that can process the user command among the plurality of applications; and identify the target application among the at least one application based on a use frequency of the at least one application.

8. The electronic apparatus of claim 1, wherein the at least one processor is further configured to:

based on identifying an update of the target application, update the first UI graph by identifying a new UI among a plurality of UIs provided by the target application as one of the plurality of first nodes or adding the UI displayed through the display as a new node based on metadata of each of the plurality of UIs provided by the target application, and identifying a new connective relation among the nodes based on actions that can be performed in each of the plurality of UIs provided by the target application.

9. The electronic apparatus of claim 1, wherein the at least one processor is further configured to:

based on metadata of each of the plurality of UIs provided by each application of the plurality of applications, identify each of the plurality of UIs as one of the plurality of nodes; and identify the plurality of edges indicating the connective relation among the nodes based on actions that can be performed in each of the plurality of UIs to acquire the UI graph of each application of the plurality of applications.

10. The electronic apparatus of claim 9, wherein the at least one processor is further configured to:

acquire the metadata of each of the plurality of UIs from an operating system installed in the electronic apparatus.

11. A method performed by an electronic apparatus having memory storing a plurality of nodes corresponding to a plurality of user interface (UI) types provided by an application and a UI graph, for each application of a plurality of applications, including a plurality of edges indicating a connective relation among the plurality of nodes based on actions that can be performed in the plurality of nodes, the method comprising:

based on receiving a user voice, performing natural language understanding (NLU) for the user voice and identifying a user command included in the user voice, at least one parameter, and a target application;

identifying a first UI graph corresponding to the target application;

acquiring information on a target node that will perform the user command among a plurality of first nodes included in the first UI graph based on the user command and the at least one parameter;

identifying a current node corresponding to a UI displayed through a display of the electronic apparatus;

identifying an action sequence from the current node to the target node based on information on the current node and the information on the target node; and performing an action corresponding to the user voice based on the action sequence, wherein the information on the target node comprises:

identification information for the target node that will perform the user command, action information corresponding to the user command to be performed in the target node, and information on the at least one parameter, and wherein, to acquire the UI graph of each application of the plurality of applications, the method further comprises:

identifying the plurality of edges indicating the connective relation among the plurality of nodes by executing a plurality of UI elements included in each of a plurality of UIs provided by each application of the plurality of applications; and converting a predetermined UI element among the plurality of UI elements into a parameter to acquire the UI graph of each application of the plurality of applications and thereby reduce a capacity of at least one UI graph from among the UI graph of each application of the plurality of applications.

12. The method of claim 11, wherein the performing of the action comprises:

performing the action corresponding to the user voice in the target node based on the at least one parameter.

13. The method of claim 11, wherein the performing of the action comprises:

performing the action corresponding to the user voice by sequentially performing actions in a plurality of second nodes included in the action sequence.

14. The method of claim 13, wherein the performing of the action comprises:

based on it being impossible to perform at least one action in one node among the plurality of second nodes, identifying a new action sequence from the one node in which it is impossible to perform the at least one action to the target node based on information on the one node in which it is impossible to perform the at least one action and the information on the target node; and performing the action corresponding to the user voice based on the new action sequence.

15. The method of claim 14, further comprising:

identifying a shortest route from the current node to the target node based on the plurality of first nodes and a plurality of first edges corresponding to the plurality of first nodes; and identifying the action sequence based on the shortest route.

16. The method of claim 15, further comprising:

based on the target application having been executed, identifying the current node based on a UI of the target application displayed through the display; and based on the target application not having been executed, executing the target application, and identify the current node based on the UI of the target application displayed through the display.

17. The electronic apparatus of claim 5, wherein the shortest route is determined based on a predetermined standard, and wherein the predetermined standard includes selecting a shortest route among a plurality of routes that are free from viewing an advertisement.

* * * * *